(12) United States Patent
Morimoto et al.

(10) Patent No.: US 11,858,499 B2
(45) Date of Patent: Jan. 2, 2024

(54) VEHICLE CONTROL DEVICE

(71) Applicant: HONDA MOTOR CO., LTD., Tokyo (JP)

(72) Inventors: Yurina Morimoto, Tokyo (JP); Yuki Nakada, Tokyo (JP); Taichi Kitamura, Tokyo (JP); Toshimi Kaneko, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 17/678,149

(22) Filed: Feb. 23, 2022

(65) Prior Publication Data

US 2022/0297677 A1    Sep. 22, 2022

(30) Foreign Application Priority Data

Mar. 16, 2021   (JP) ................................. 2021-042609

(51) Int. Cl.
| | |
|---|---|
| *B60W 30/06* | (2006.01) |
| *B60W 50/10* | (2012.01) |
| *B60W 50/14* | (2020.01) |
| *B60W 50/12* | (2012.01) |

(52) U.S. Cl.
CPC ............ *B60W 30/06* (2013.01); *B60W 50/10* (2013.01); *B60W 50/12* (2013.01); *B60W 50/14* (2013.01)

(58) Field of Classification Search
CPC ...... B60W 30/06; B60W 50/10; B60W 50/12; B60W 50/14; B60W 30/19; B60W 30/181; F16H 61/18; F16H 63/48; B62D 15/0285; B60T 7/12
See application file for complete search history.

(56) References Cited

U.S. PATENT DOCUMENTS 11,312,388 B2 * 4/2022 Sannodo ............... B60W 30/06

FOREIGN PATENT DOCUMENTS

JP          5-272632        10/1993

\* cited by examiner

*Primary Examiner* — Xiao En Mo
(74) *Attorney, Agent, or Firm* — Rankin, Hill & Clark LLP

(57) ABSTRACT

A vehicle control device includes: a shift-position-switching acceptance unit that accepts switching operation of the shift position of the transmission but does not accept switching operation from a shift position other than the first forward position and the second forward position to the second forward position without via the first forward position; and an automatic-parking control unit that, in a case of moving the vehicle forward during execution of automatic parking control in a state in which the shift position of the transmission is set at a shift position other than the first forward position and the second forward position, sets the shift position of the transmission to the first forward position to move the vehicle forward.

3 Claims, 7 Drawing Sheets

VEHICLE CONTROL DEVICE

INCORPORATION BY REFERENCE

The present application claims priority under 35 U.S.C. § 119 to Japanese Patent Application No. 2021-042609 filed on Mar. 16, 2021. The content of the application is incorporated herein by reference in its entirety.

BACKGROUND OF THE INVENTION

Field of the Invention

The present invention relates vehicle control devices.

Description of the Related Art

There have been proposed vehicle control devices including an automatic parking function (for example, see Japanese Patent Laid-Open No. 5-272632). In such a vehicle control device, when the shift lever is operated to a shift position other than the parking position during execution of automatic parking while the foot brake is pressed down, the automatic parking is discontinued, and the ordinary shift-position switch control of the automatic transmission is executed.

SUMMARY OF THE INVENTION

As for the shift positions of the automatic transmission for the forward direction, vehicles having not only the drive (D) position but also sport (S), brake (B), low (L), and the like which are speed-reduction positions having larger speed reduction ratios than the D position are widespread. In the specifications for such vehicles, when the shift position is switched to a position other than those for the forward direction (reverse or parking) during traveling with the second position, and the shift position is switched again to one for the forward direction, the vehicle starts with the D position.

The purpose of such specifications is to prevent the sense of incongruity given to the user by traveling with a speed-reduction position that does not match the user's intention. It is also desirable during automated driving to prevent switching of the shift position that gives the user of the vehicle the sense of incongruity, as described above.

An object of the present invention, which has been made in light of such a background, is to provide a vehicle control device in which switching of the shift position that gives the user of the vehicle the sense of incongruity is prevented during automatic parking.

An aspect to achieve the above object is a vehicle control device that controls operation of a vehicle including a transmission having, as shift positions for the forward direction, a first forward position and a second forward position having a larger speed reduction ratio than the first forward position, the vehicle control device including: a shift-position-switching acceptance unit that accepts switching operation of the shift position of the transmission by a driver but does not accept switching operation from a shift position other than the first forward position and the second forward position to the second forward position without via the first forward position; and an automatic-parking control unit that executes automatic parking control of the vehicle and that, in a case of moving the vehicle forward during execution of the automatic parking control in a state in which the shift position of the transmission is set at a shift position other than the first forward position and the second forward position, switches the shift position of the transmission to the first forward position to move the vehicle forward.

The above vehicle control device may have a configuration in which when the shift-position-switching acceptance unit accepts switching operation to the second forward position during execution of the automatic parking control, the automatic-parking control unit discontinues the automatic parking control, makes a notification to prompt the driver to select cancellation or resumption of the automatic parking control, and upon recognizing the driver's instruction for cancellation or resumption of the automatic parking control, cancels or resumes the automatic parking control with the shift position of the transmission set at the second forward position.

The above vehicle control device may have a configuration in which the shift-position-switching acceptance unit accepts switching operation to the first forward position and the second forward position according to the driver's operation of a single operation element, and when the single operation element is operated within a specified time from the time point when the shift position of the transmission is switched from a reverse position to the first forward position during execution of the automatic parking control, the automatic-parking control unit keeps the shift position of the transmission at the first forward position.

With the above vehicle control device, it is possible to prevent switching of the shift position that gives the user of the vehicle the sense of incongruity during automatic parking.

DETAILED DESCRIPTION OF THE PREFERRED EMBODIMENTS

1. Configurations of Vehicle Control Device and Vehicle

Figure 1:
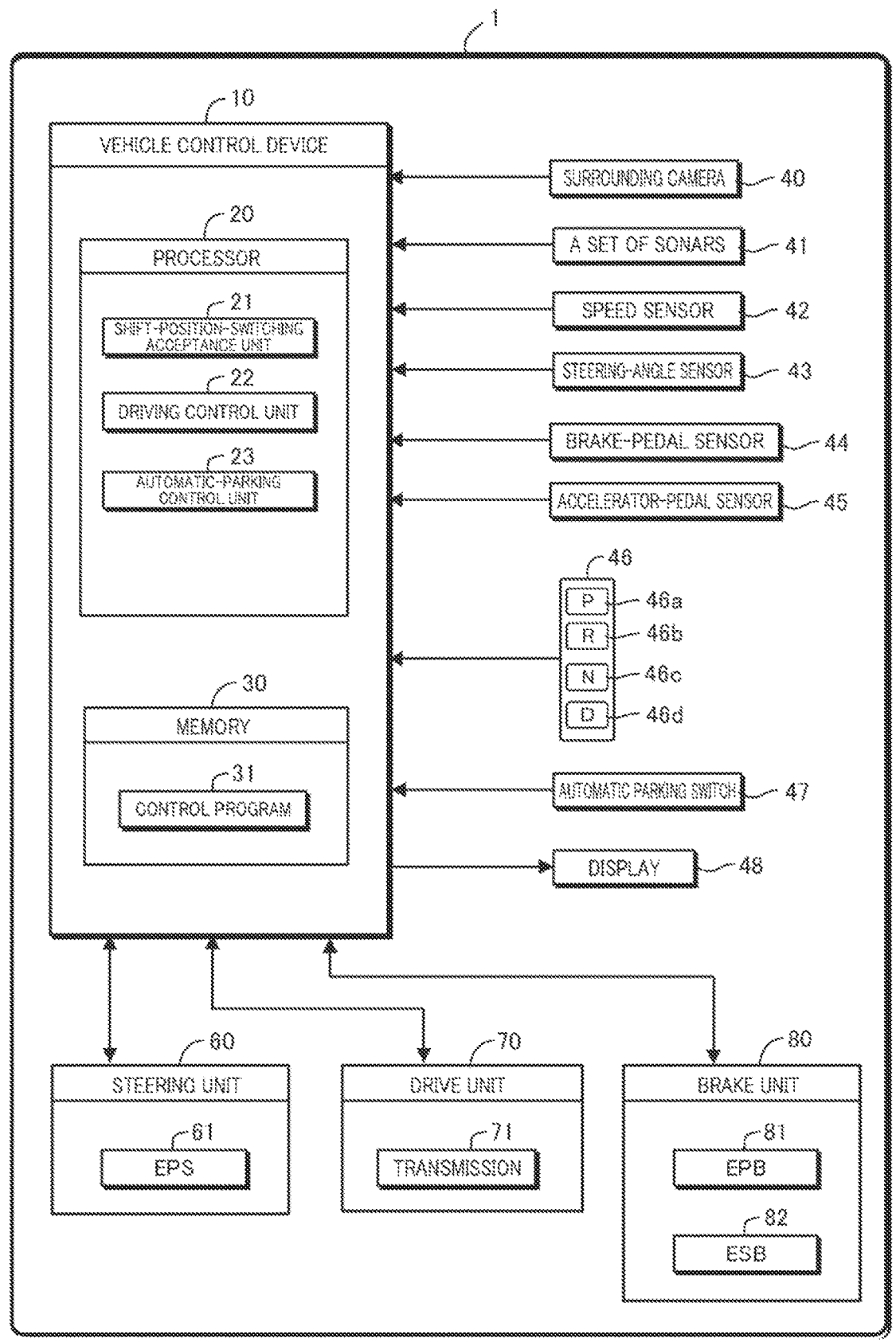
FIG. 1 illustrates configuration diagrams of a vehicle control device and a vehicle on which the vehicle control device is mounted.

With reference to FIG. 1, the configuration of a vehicle control device 10 of the present embodiment and the configuration of a vehicle 1 on which the vehicle control device 10 is mounted will be described. The vehicle 1 includes a steering unit 60 including an electric power steering (EPS) 61, a drive unit 70 including a transmission 71 and a not-illustrated drive portion (an electric motor, an engine, or the like), and a brake unit 80 including an electric parking brake (EPB) 81 and an electric servo brake (ESB) 82.

The transmission 71 has, as the shift positions for the forward direction, a drive (D) position and a brake (B)

position which has a larger speed reduction ratio than the D position. The D position corresponds to a first forward position of the present disclosure, and the B position corresponds to a second forward position of the present disclosure. Note that the name of the second forward position may be a sport (S) position, a low (L) position, or the like instead of the B position. In addition, the transmission 71 has a reverse (R) position which is the shift position for the backward direction, a neutral (N) position, and a parking (P) position. The R position corresponds to a reverse position of the present disclosure.

The vehicle 1 also includes surrounding cameras 40 (including a front camera, a rear camera, a right-side camera, and a left-side camera) that capture images of the surroundings of the vehicle 1 and a set of sonars 41 (including a set of front sonars, a set of rear sonars, a set of right-side sonars, and a set of left-side sonars) that detects target objects present around the vehicle 1.

The vehicle 1 further includes a speed sensor 42 that detects the traveling speed of the vehicle 1, a steering-angle sensor 43 that detects the steering angle of the steering wheel (not illustrated), a brake-pedal sensor 44 that detects the degree of pressing-down of the brake pedal (not illustrated), an accelerator-pedal sensor 45 that detects the degree of pressing-down of the accelerator pedal (not illustrated), a shift switch 46, an automatic parking switch 47, and a display 48.

The shift switch 46 includes a P switch 46a, an R switch 46b, an N switch 46c, and a D switch 46d which are switches for switching the shift position of the transmission 71. The D switch 46d is a switch that gives an instruction to switch to the D position and the B position, and corresponds to a single operation element of the present disclosure. The automatic parking switch 47 gives an instruction to execute automatic parking which will be described later. The display 48 is, for example, a display audio (DA), a multi information display (MID), or the like.

The vehicle control device 10 is a control unit including a processor 20, memory, and a not-illustrated interface circuit. The vehicle control device 10 receives input of images captured by the surrounding cameras 40, detection information on target objects detected by the set of sonars 41, speed detection signals detected by the speed sensor 42, steering-angle detection signals detected by the steering-angle sensor 43, detection signals on the degree of pressing-down detected by the brake-pedal sensor 44, detection signals on the degree of pressing-down detected by the accelerator-pedal sensor 45, operation signals of the shift switch 46, and operation signals of the automatic parking switch 47. The vehicle control device 10 outputs control signals that control the display content on the display 48.

The vehicle control device 10 outputs control signals to control the operation of the steering unit 60, the drive unit 70, and the brake unit 80, and detection signals of not-illustrated various sensors included in each unit 60, 70, or 80 are input to the vehicle control device 10.

The processor 20 reads and executes a control program 31 for the vehicle 1 stored in the memory 30 to control the operation of the vehicle 1 and functions as a shift-position-switching acceptance unit 21, a driving control unit 22, and an automatic-parking control unit 23. The shift-position-switching acceptance unit 21 recognizes the operational condition of the switches 46a to 46d from the operation signals output from the shift switch 46, and accepts switching to the shift position according to the operated switch. Then, the driving control unit 22 switches the shift position of the transmission 71 according to the switching operation of the shift position accepted by the shift-position-switching acceptance unit 21.

As for the D switch 46d, when the D switch 46d is operated in the state in which the shift position of the transmission 71 is set at D, the shift-position-switching acceptance unit 21 accepts this operation as the operation to switch to the B position. In addition, when the D switch 46d is operated in the state in which the shift position of the transmission 71 is set at one of the P, R, and N positions, the shift-position-switching acceptance unit 21 accepts this operation as the operation to switch to the D position. With this configuration, it is impossible to switch to the B position without via switching to the D position when the shift position of the transmission 71 is set at one of the P, R, and N positions. In other words, in this specification, the driver can switch from the P, R, or N position to the B position only after switching to the D position.

The driving control unit 22 recognizes the operation of the steering, the brake pedal, the accelerator pedal, the shift switch 46, and the like by the driver of the vehicle 1 from detection signals of the steering-angle sensor 43, the brake-pedal sensor 44, the accelerator-pedal sensor 45, the shift switch 46, and the like. Then, according to the operation of these, the driving control unit 22 controls the operation of the steering unit 60, the drive unit 70, and the brake unit 80 to control the traveling of the vehicle 1.

Figure 2:
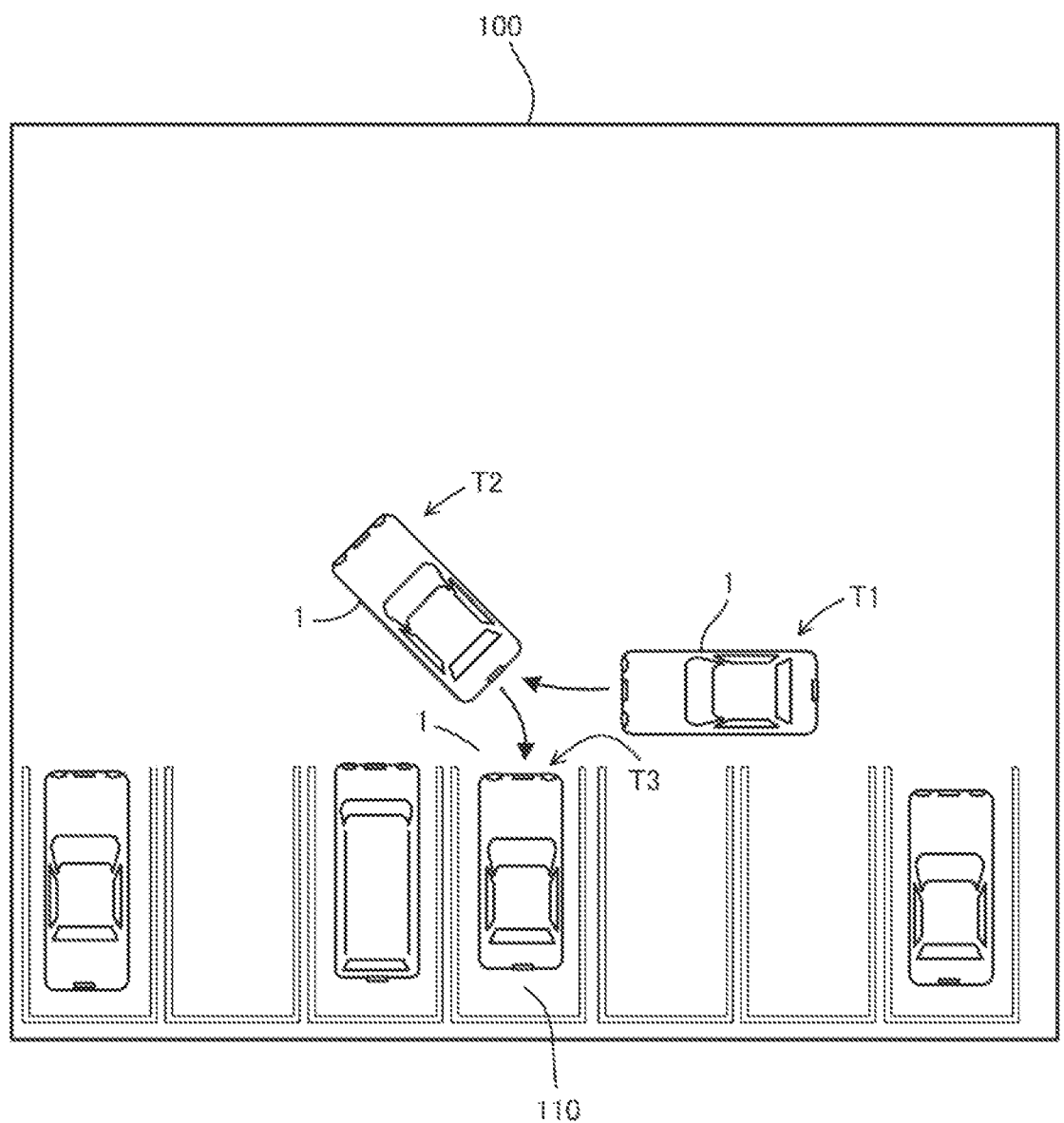
FIG. 2 is a diagram for explaining how a vehicle travels in automatic parking.

The automatic-parking control unit 23, when the automatic parking switch 47 is operated, executes automatic parking control which makes the vehicle 1 automatically travel to an empty slot 110 of a parking lot 100 and completes parking, as illustrated in FIG. 2. In FIG. 2, the driver of the vehicle 1 stops the vehicle 1 near the empty slot 110 (the state of T1), and operates the automatic parking switch 47 to give an instruction to execute the automatic parking.

The automatic-parking control unit 23 executes the following processes in the automatic parking control. The automatic-parking control unit 23 first recognizes the parking-slot borders of the empty slot 110 from images captured by the surrounding cameras 40 to recognize the real space position of the empty slot 110. The automatic-parking control unit 23 also recognizes whether obstacles are present around the empty slot 110, based on images captured by the surrounding cameras 40 and detection information on target objects detected by the set of sonars 41. Then, based on these recognition results, the automatic-parking control unit 23 generates a target path from the current position of the vehicle 1 to the empty slot 110.

Figure 3:
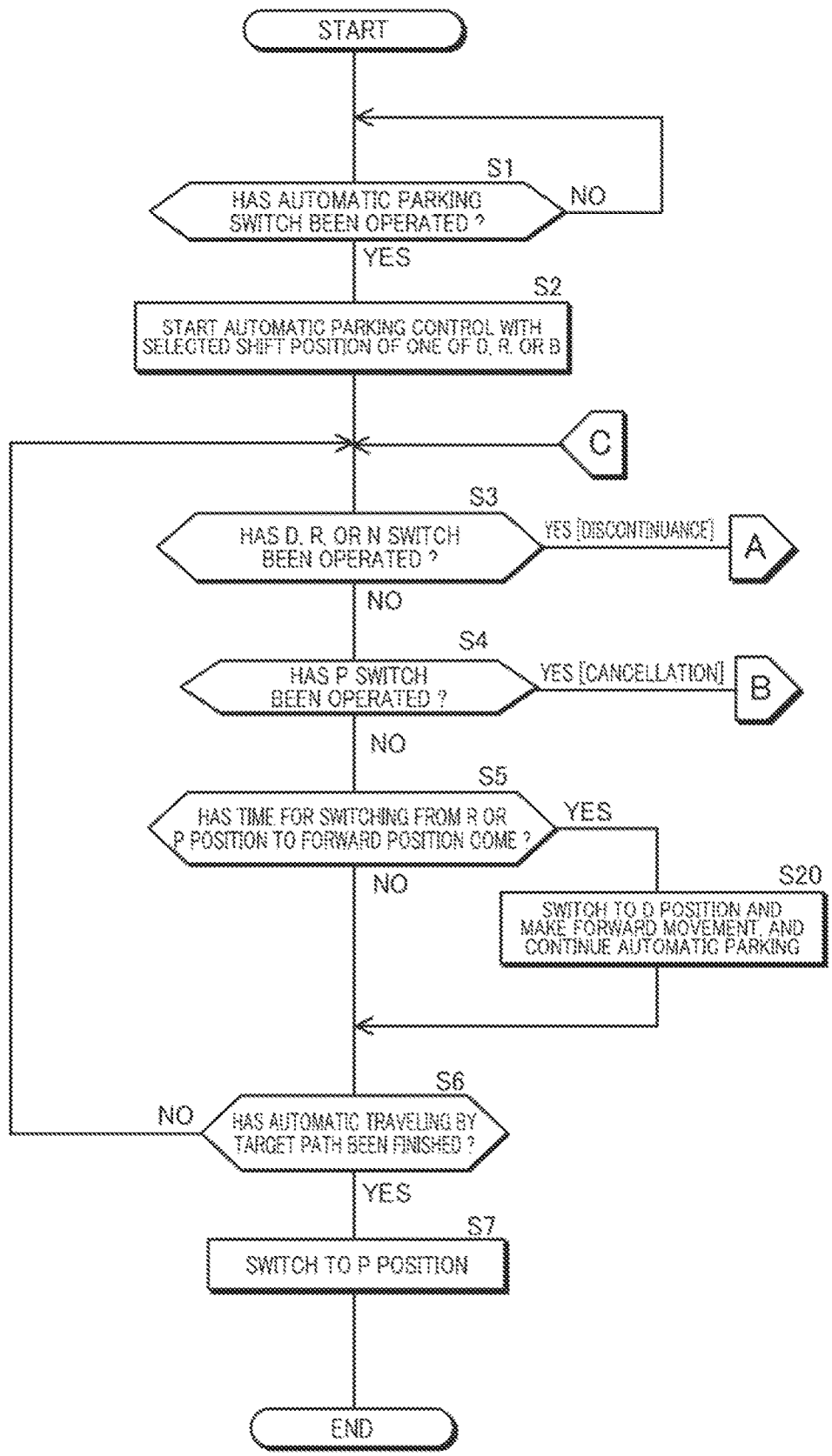
FIG. 3 is a first flowchart of automatic parking control.

Next, the automatic-parking control unit 23 controls the operation of the steering unit 60, the drive unit 70, and the brake unit 80 to make the vehicle 1 automatically travel along the target path to the empty slot 110 and stop, and thus completes parking of the vehicle 1 into the empty slot 110. In the example of FIG. 3, the vehicle 1 moves forward to be in the state of T2, then moves backward, and stops in the empty slot 110 as indicated by T3.

2. Processes of Automatic Parking Control

Based on the flowcharts illustrated in FIGS. 3 to 5, the execution procedure of processes of the automatic parking control will be described. In step S1 in FIG. 3, the automatic-parking control unit 23, upon recognizing that the automatic parking switch 47 is operated, advances the process to step S2 and starts controlling the automatic parking at the shift position of one of D, R, and B selected by the driver.

In the succeeding step S3, the automatic-parking control unit 23 determines whether a switching operation to switch to the shift position of one of D, R, and N has been accepted by the shift-position-switching acceptance unit 21. Then, the automatic-parking control unit 23, if such the switching operation has been accepted, advances the process to step S30 in FIG. 4, and if the switching operation has not been accepted, advances the process to step S4.

In step S4, the automatic-parking control unit 23 determines whether a switching operation to the P position has been accepted by the shift-position-switching acceptance unit 21. Then, the automatic-parking control unit 23, if the switching operation has been accepted, advances the process to step S60 in FIG. 5, and if the switching operation has not been accepted, advances the process to step S5.

In step S5, the automatic-parking control unit 23 determines whether the time has come to switch from the R or P position to a forward position in the automatic traveling along the target path. Then the automatic-parking control unit 23, if the time for switching has come, advances the process to step S20, and, if the time for switching has not come, advances the process to step S6.

In step S20, the automatic-parking control unit 23 switches the shift position of the transmission 71 to the D position to move the vehicle 1 forward and continues controlling the automatic parking, and it advances the process to step S6. With the process in step S20, even in the case in which control of the automatic parking starts in step S2 in the state in which the shift position of the transmission 71 is set at the B position, when moving the vehicle 1 forward after the shift position is switched to the R or P position, the shift position is set to the D position. With this operation, when switching from the R or P position to a forward position, the forward position is set to the D position, as in the foregoing process by the shift-position-switching acceptance unit 21 responding the driver's operation of the shift switch 46. Thus, it is possible to avoid the sense of incongruity given to the driver, which would be caused by the difference between the manual operation and the operation when switching from the R or P position to the B position as a forward position.

In step S6, the automatic-parking control unit 23 determines whether the traveling of the vehicle 1 by the target path has finished. Then, the automatic-parking control unit 23, if the traveling of the vehicle 1 by the target path has finished, advances the process to step S7, and if the traveling of the vehicle 1 by the target path has not finished, advances the process to step S3. In step S7, the automatic-parking control unit 23 switches the shift position of the transmission 71 to the P position and ends the automatic parking control.

Figure 4:
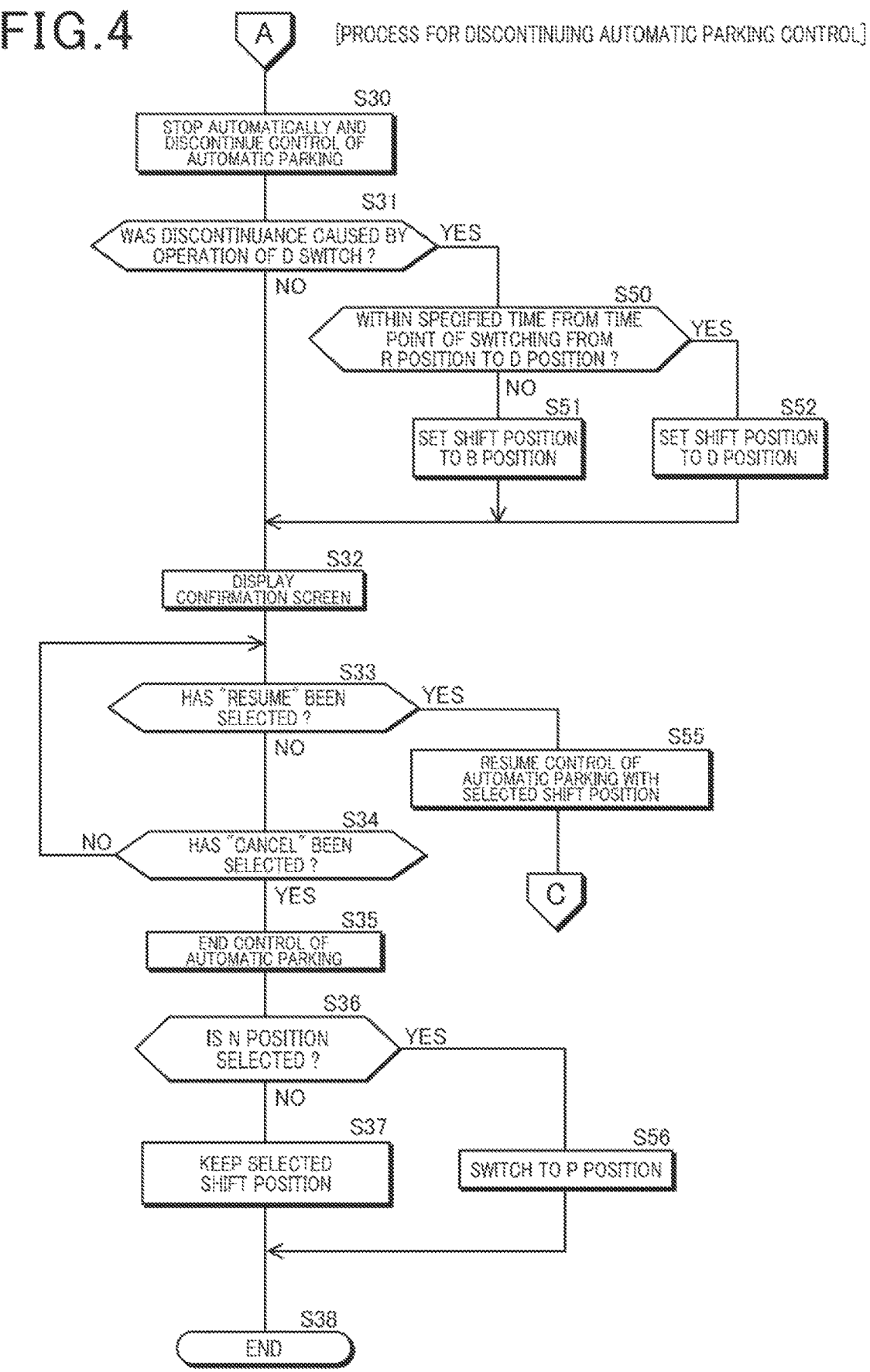
FIG. 4 is a second flowchart of the automatic parking control.

FIG. 4 is a flowchart of processes for discontinuing the automatic parking control. In step S30 in FIG. 4, the automatic-parking control unit 23 stops the vehicle 1 and discontinues the control of the automatic parking. In the next step S31, the automatic-parking control unit 23 determines whether the automatic parking control has been discontinued by operation of the D switch 46d. Then, the automatic-parking control unit 23, if the automatic parking control was discontinued by operation of the D switch 46d, advances the process to step S50, and, if the automatic parking control is discontinued by operation of the R switch 46b or the N switch 46c, advances the process to step S32.

In step S50, the automatic-parking control unit 23 determines whether the time elapsed since the time point when the shift position of the transmission 71 was switched from the R position to the D position is within a specified time (for example, 0.3 to 0.5 seconds). Then, the automatic-parking control unit 23, if the time elapsed since the time point of switching from the R position to the D position is within the specified time, advances the process to step S52, and, if the time elapsed since the time point of switching from the R position to the D position has exceeded the specified time, advances the process to step S51.

In step S52, the automatic-parking control unit 23 sets the shift position of the transmission 71 to the D position and advances the process to step S32. With this operation, in the case in which because the switching operation to the D position was made just after the shift position was switched from the R position to the D position, it is inferred that the driver has an intention to switch to the D position in the state of the R position, it is possible to switch to the D position according to the driver's intention.

In step S51, the automatic-parking control unit 23 sets the shift position of the transmission 71 to the B position and advances the process to step S32. With this operation, in the case in which because the D switch 46d was operated after a certain time had passed since the shift position had been switched from the R position to the D position, it is inferred that the driver, recognizing that the shift position was set at the D position, intended to switch to the B position and operated the D switch 46d, it is possible to switched to the B position according to the driver's intention.

Figure 6:
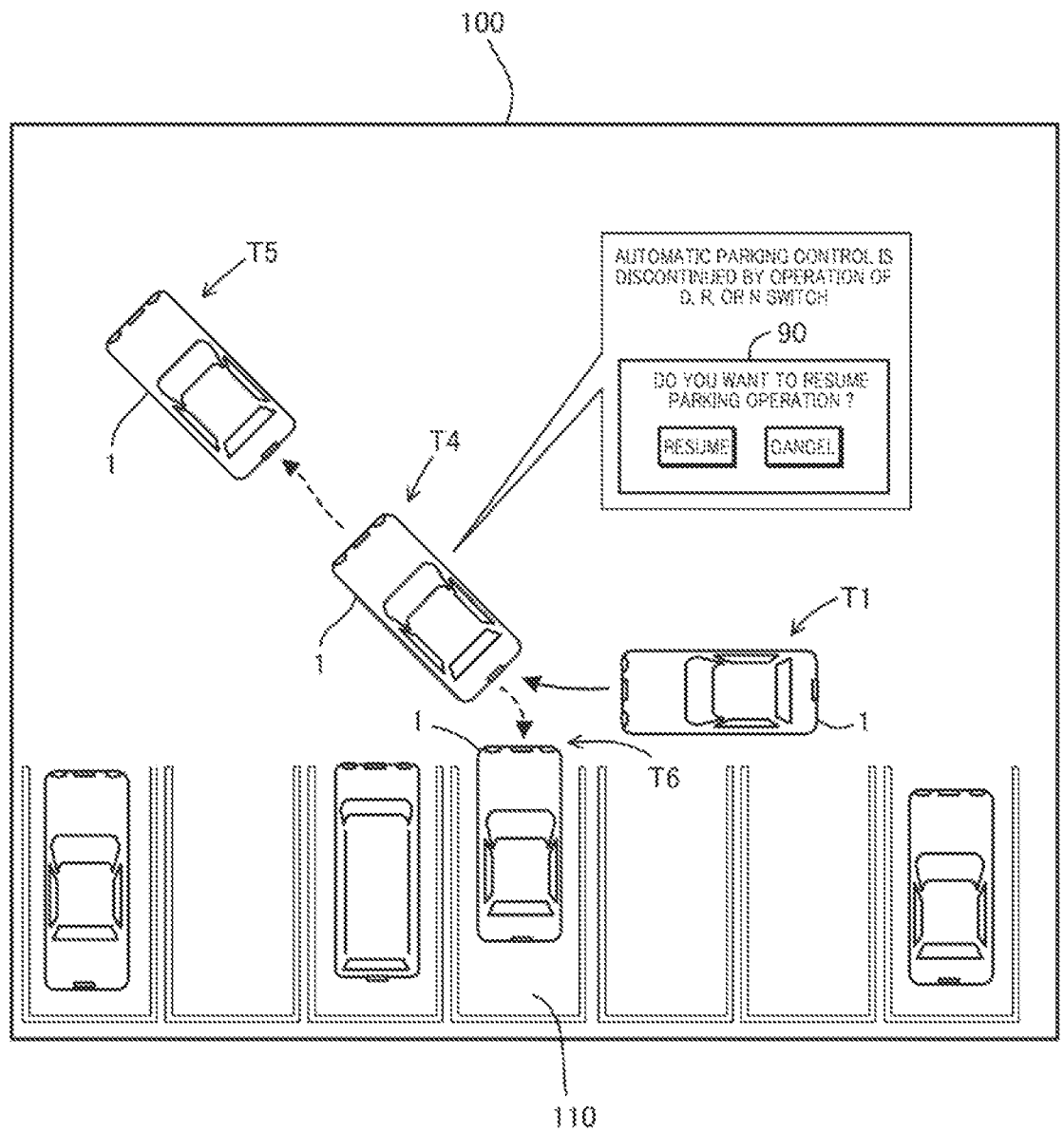
FIG. 6 is a diagram for explaining how the vehicle travels in the case in which the automatic parking control is discontinued.

In step S32, the automatic-parking control unit 23, as illustrated in FIG. 6, displays a confirmation screen 90 on the display 48 prompting the driver to make a selection to resume or cancel the automatic parking. In FIG. 6, the vehicle 1 started the automatic parking from the state of T1 and is being stopped because an operation to discontinues the automatic parking was made in the state of T4.

In the next step S33, the automatic-parking control unit 23 determines whether "resume" has been selected by operation of a not-illustrated selection switch. Then, if "resume" is selected, the automatic-parking control unit 23 advances the process to step S55, resumes control of the automatic parking with the selected shift position, and advances the process to step S3 in FIG. 3. In the example of FIG. 6, with the resumption of control of the automatic parking, the vehicle 1, as indicated by T6, automatically travels toward the empty slot 110.

If "resume" is not selected, the automatic-parking control unit 23 advances the process from step S33 to step S34, and determines whether "cancel" has been selected by operation of the not-illustrated selection switch. Then, the automatic-parking control unit 23, if "cancel" has been selected, advances the process to step S35, and, if "cancel" has not been selected, advances the process to step S33.

In step S35, the automatic-parking control unit 23 ends the control of the automatic parking. In the succeeding step S36, the automatic-parking control unit 23 determines whether the selected shift position is N. Then, the automatic-parking control unit 23, if the selected shift position is N, advances the process to step S56, and, if the selected shift position is not N, advances the process to step S38. In step S56, the automatic-parking control unit 23 switches the shift position to P, and puts the vehicle 1 in a stopped state. In step S37, the automatic-parking control unit 23 keeps the selected shift position of the transmission 71. With the cancellation of the automatic parking control, in the example of FIG. 6, the vehicle 1 transitions to ordinary traveling by the driver's operation as indicated by T5.

Figure 5:
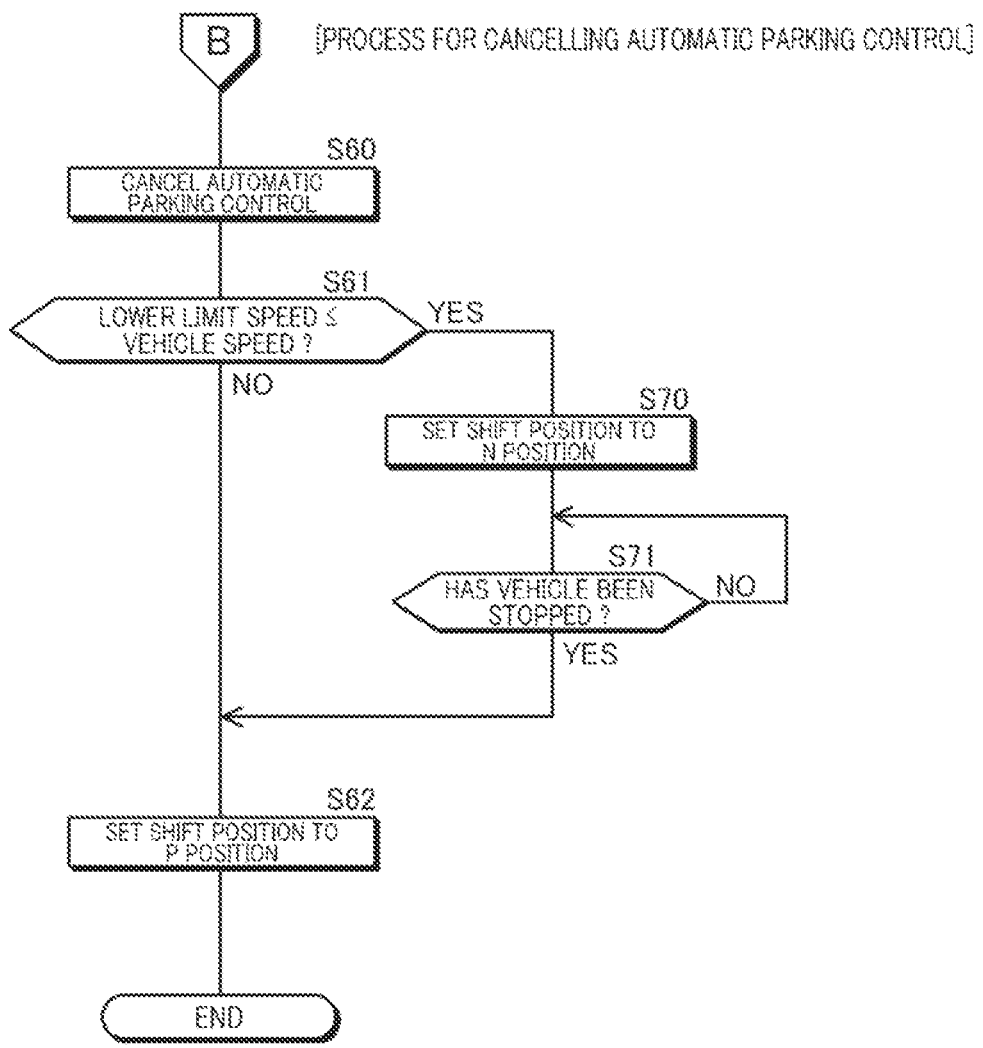
FIG. 5 is a third flowchart of the automatic parking control.

Next, FIG. 5 is a flowchart of processes for canceling the automatic parking control. In step S60 in FIG. 5, the automatic-parking control unit 23 cancels the automatic parking control. In the succeeding step S61, the automatic-parking control unit 23 determines whether the traveling speed of the vehicle 1 detected by the speed sensor 42 is lower than or equal to a specified lower-limit speed (for example, 2 km/h). Then, the automatic-parking control unit 23, if the traveling speed of the vehicle 1 is higher than the lower-limit speed, advances the process to step S70 and, if the traveling speed of the vehicle 1 is lower than or equal to the lower-limit speed, advances the process to step S62.

In step S70, the automatic-parking control unit 23 sets the shift position to N. In the next step S71, the automatic-parking control unit 23, upon recognizing from the speed detected by the speed sensor 42 that the vehicle 1 has stopped, advances the process to step S61. In step S62, the automatic-parking control unit 23 sets the shift position of the transmission 71 to the P position and puts the vehicle 1 in a stopped state.

Figure 7:
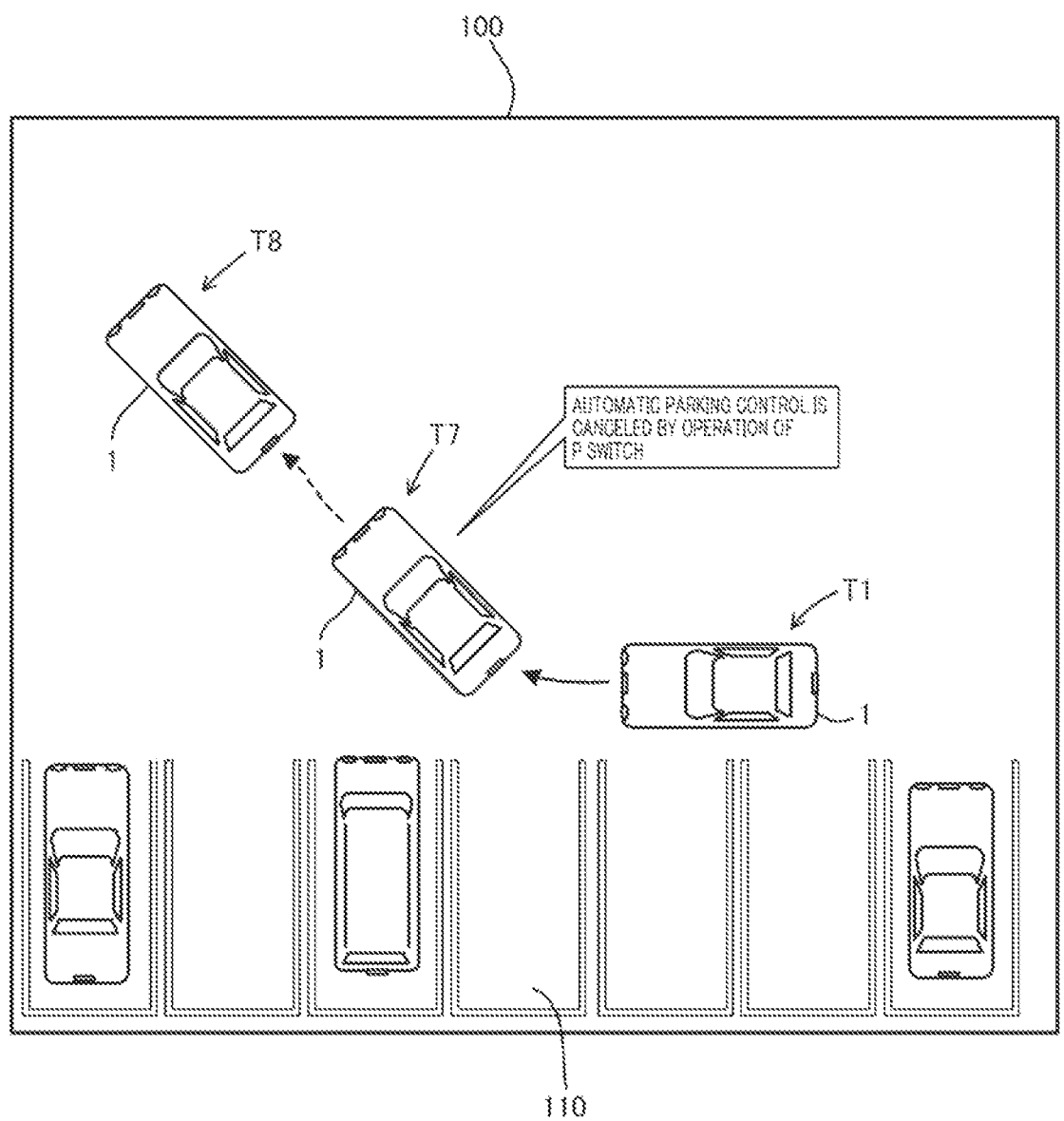
FIG. 7 is a diagram for explaining how the vehicle travels in the case in which the automatic parking control is canceled.

FIG. 7 illustrates, as an example, a case in which the automatic parking control of the vehicle 1 starts from the state of T1, and in the state of T7, the automatic parking control is canceled by the operation of the P switch 46a by the driver. The shift position of the transmission 71 is set to the P position at T7, and the vehicle 1 is put into a stopped state. Then, in the example of FIG. 7, the vehicle 1 transitions to ordinary traveling by the driver's operation as indicated by T8.

3. Other Embodiments

In the above embodiment, through processes in step S31 and steps S50 to S52 in FIG. 4, operation of the D button switches the shift position to either the D position or the B position depending on the time elapsed since the time point of switching from the R position to the D position. However, as another embodiment, this process may be eliminated, and operation of the D button in the state of the D position may indiscriminately switch the shift position to the B position.

Although in the above embodiment, when the automatic parking control is discontinued, the automatic-parking control unit 23 makes notification by displaying the confirmation screen 90 prompting the driver to select resumption or cancellation of the automatic parking control as illustrated in FIG. 6, the automatic-parking control unit 23 may make notification by outputting voice prompting the driver to select resumption or cancellation of the automatic parking control from a speaker (not illustrated) included in the vehicle 1. In this case, the driver' voice for selection and instruction may be recognized by a microphone (not illustrated) included in the vehicle 1.

Note that FIG. 1 is a schematic diagram illustrating the configurations of the vehicle 1 and the vehicle control device 10 divided according to the main processes, to make it easy to understand the invention of the present application, and hence the configuration of the vehicle control device 10 may be divided differently. The processes of the constituents may be executed by one hardware unit or a plurality of hardware units. The processes of the constituents illustrated in FIGS. 3 to 5 may be executed by one program or a plurality of programs.

4. Configurations Supported by Above Embodiments

The above embodiments are specific examples of the configurations described below.

(Configuration 1) A vehicle control device that controls operation of a vehicle including a transmission having, as shift positions for the forward direction, a first forward position and a second forward position having a larger speed reduction ratio than the first forward position, the vehicle control device including: a shift-position-switching acceptance unit that accepts switching operation of the shift position of the transmission by a driver but does not accept switching operation from a shift position other than the first forward position and the second forward position to the second forward position without via the first forward position; and an automatic-parking control unit that executes automatic parking control of the vehicle and that, in a case of moving the vehicle forward during execution of the automatic parking control in a state in which the shift position of the transmission is set at a shift position other than the first forward position and the second forward position, switches the shift position of the transmission to the first forward position to move the vehicle forward.

With the vehicle control device according to configuration 1, it is possible to prevent switching of the shift position that gives the user of the vehicle the sense of incongruity during automatic parking.

(Configuration 2) The vehicle control device according to configuration 1, in which when the shift-position-switching acceptance unit accepts switching operation to the second forward position during execution of the automatic parking control, the automatic-parking control unit discontinues the automatic parking control, makes a notification to prompt the driver to select cancellation or resumption of the automatic parking control, and upon recognizing the driver's instruction for cancellation or resumption of the automatic parking control, cancels or resumes the automatic parking control with the shift position of the transmission set at the second forward position.

With the vehicle control device according to configuration 2, in the case in which the automatic parking control is discontinued during execution of the automatic parking control by the driver's switching operation to the second forward position, it is inferred that the driver has a clear intention of switching to the second forward position. Accordingly, the automatic parking control is canceled or resumed with the shift position of the transmission at the second forward position, and thus, it is possible to perform shift-position switching reflecting the driver's intention.

(Configuration 3) The vehicle control device according to configuration 1 or 2, in which the shift-position-switching acceptance unit accepts switching operation to the first forward position and the second forward position according to the driver's operation of a single operation element, and when the single operation element is operated within a specified time from the time point when the shift position of the transmission is switched from a reverse position to the first forward position during execution of the automatic parking control, the automatic-parking control unit keeps the shift position of the transmission at the first forward position.

With the vehicle control device according to configuration 3, in the case in which because the single operation element was operated just after the shift position was switched from the reverse position to the first forward position, and thus, it is inferred that the driver operated the single operation element, intending to switch to the first forward position in the state of the reverse position, it is possible to switch to the first forward position according to the driver's intention.

REFERENCE SIGNS LIST 1 vehicle
10 vehicle control device 20 processor
21 shift-position-switching acceptance unit
22 driving control unit
23 automatic-parking control unit
30 memory
31 control program
40 surrounding camera
41 a set of sonars
42 speed sensor
43 steering-angle sensor
44 brake-pedal sensor
45 accelerator-pedal sensor
46 shift switch
47 automatic parking switch
48 display
60 steering unit
70 drive unit
80 brake unit
90 confirmation screen
110 empty slot

What is claimed is:

1. A vehicle control device that controls operation of a vehicle including a transmission having, as shift positions for the forward direction, a first forward position and a second forward position having a larger speed reduction ratio than the first forward position, the vehicle control device comprising:
 a shift-position-switching acceptance unit that accepts switching operation of the shift position of the transmission by a driver but does not accept switching operation from a shift position other than the first forward position and the second forward position to the second forward position without via the first forward position; and
 an automatic-parking control unit that executes automatic parking control of the vehicle and that, in a case of moving the vehicle forward during execution of the automatic parking control in a state in which the shift position of the transmission is set at a shift position other than the first forward position and the second forward position, switches the shift position of the transmission to the first forward position to move the vehicle forward.

2. The vehicle control device according to claim 1, wherein
 when the shift-position-switching acceptance unit accepts switching operation to the second forward position during execution of the automatic parking control, the automatic-parking control unit discontinues the automatic parking control, makes a notification to prompt the driver to select cancellation or resumption of the automatic parking control, and upon recognizing the driver's instruction for cancellation or resumption of the automatic parking control, cancels or resumes the automatic parking control with the shift position of the transmission set at the second forward position.

3. The vehicle control device according to claim 1, wherein
 the shift-position-switching acceptance unit accepts switching operation to the first forward position and the second forward position according to the driver's operation of a single operation element, and
 when the single operation element is operated within a specified time from the time point when the shift position of the transmission is switched from a reverse position to the first forward position during execution of the automatic parking control, the automatic-parking control unit keeps the shift position of the transmission at the first forward position.

* * * * *